United States Patent
Cornett et al.

(10) Patent No.: US 12,152,667 B1
(45) Date of Patent: Nov. 26, 2024

(54) GEARBOX COVER WITH PLANETARY CARRIER

(71) Applicant: Schaeffler Technologies AG & Co. KG, Herzogenaurach (DE)

(72) Inventors: Paul Cornett, Baltimore, OH (US); Luke Bear, Chardon, OH (US); Thomas Caillet, Dalton, OH (US); Matthew Beebe, Canton, OH (US); Avery Kaufmann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/599,319

(22) Filed: Mar. 8, 2024

(51) Int. Cl.
  *F16H 57/08* (2006.01)
  *F16H 57/023* (2012.01)
  *F16H 57/04* (2010.01)

(52) U.S. Cl.
  CPC ......... *F16H 57/082* (2013.01); *F16H 57/023* (2013.01); *F16H 57/0479* (2013.01); *F16H 2057/085* (2013.01)

(58) Field of Classification Search
  CPC .. F16H 57/0479; F16H 57/082; F16H 57/023; F16H 2057/085
  See application file for complete search history.

(56) References Cited

U.S. PATENT DOCUMENTS

| | | | |
|---|---|---|---|
| 8,267,826 B2 * | 9/2012 | Duong | F16H 57/0479 475/159 |
| 9,982,577 B2 * | 5/2018 | Kohrs | F01L 1/352 |
| 11,598,407 B1 * | 3/2023 | Desjardins | F01D 25/18 |
| 2009/0247348 A1 * | 10/2009 | Haupt | F16C 33/6677 475/159 |
| 2014/0116654 A1 * | 5/2014 | McGlaun | F16H 57/0417 165/104.34 |
| 2016/0091082 A1 * | 3/2016 | Boland | F03D 15/10 475/159 |
| 2020/0063855 A1 * | 2/2020 | Devreese | F16H 57/0486 |
| 2022/0145806 A1 * | 5/2022 | Beck | F16H 1/28 |
| 2022/0243662 A1 * | 8/2022 | Mouly | F02C 7/36 |

FOREIGN PATENT DOCUMENTS

WO         2023285089 A1    1/2023

\* cited by examiner

*Primary Examiner* — Timothy Hannon

(57) ABSTRACT

A gearbox cover includes a front side with a planetary carrier and a back side with a flow passage. The planetary carrier includes a first annular portion with a plurality of holes, a second annular portion, axially spaced from the first annular portion, with a first plurality of through holes, each aligned with one of the holes, and a plurality of webs connecting the first annular portion with the second annular portion. In an example embodiment, the front side also includes a tubular portion. A gearbox cover assembly with a flow passage cover and a planetary gear assembly are also disclosed.

15 Claims, 5 Drawing Sheets

GEARBOX COVER WITH PLANETARY CARRIER

TECHNICAL FIELD

The present disclosure relates generally to a gearbox cover, and more specifically to a gearbox cover with a planetary carrier.

BACKGROUND

Gearbox covers for planetary gearsets are known. One example is shown and described in PCT Publication No. WO 2023/285089 A1 titled TRANSMISSION FOR AN INTEGRAL DIFFERENTIAL, INTEGRAL DIFFERENTIAL AND DRIVE TRAIN to Reisch et al.

SUMMARY

Example aspects broadly comprise a gearbox cover including a front side with a planetary carrier and a back side with a flow passage. The planetary carrier includes a first annular portion with a plurality of holes, a second annular portion, axially spaced from the first annular portion, with a first plurality of through holes, each aligned with one of the holes, and a plurality of webs connecting the first annular portion with the second annular portion. In an example embodiment, the front side also includes a tubular portion.

In some example embodiments, the flow passage includes a radial segment connected to a partial circular segment. In an example embodiment, the gearbox cover also includes a first flow passage hole arranged at a radially outer portion of the radial segment or a second flow passage hole arranged at a radially inner portion of the radial segment. In an example embodiment the gearbox cover also includes a first flow passage hole arranged at a radially outer portion of the radial segment and the first flow passage hole is arranged for receiving a lubricant. In an example embodiment, the gearbox cover also includes a second plurality of through holes, each connecting the flow passage with one of the holes. In an example embodiment, the gearbox cover also includes a plurality of radially outer holes for fixing the gearbox cover to a gearbox housing.

Other example aspects broadly comprise a gearbox cover assembly including the gearbox cover and a flow passage cover. The flow passage is a groove formed in the gearbox cover and the flow passage cover seals the groove. In an example embodiment, the flow passage cover is fixed to the flow passage by friction stir welding. In an example embodiment, the gearbox cover is a cast aluminum component and the flow passage cover is a stamped steel or a stamped aluminum component.

Other example aspects broadly comprise a planetary gear assembly including the gearbox cover assembly and a plurality of planetary gears rotatably mounted on a plurality of planetary pins. Each one of the plurality of planetary pins is positioned in one of the plurality of holes and in one of the first plurality of through holes. In some example embodiments, the planetary gear assembly also includes a sun gear drivingly engaged with the plurality of planetary gears and a radial bearing. The gearbox cover also includes a tubular portion and the sun gear is rotatably mounted on the tubular portion by the radial bearing. In an example embodiment, the planetary gear assembly also includes a ball bearing. The tubular portion has a counterbore and the ball bearing is positioned in the counterbore.

In some example embodiments, each of the plurality of planetary pins has a respective hollow portion and a respective radial hole, and the flow passage is arranged to provide a lubricant to the hollow portions and the radial holes. In an example embodiment, the gearbox cover also includes a second plurality of through holes, each connecting the flow passage with one of the holes and one of the hollow portions. In an example embodiment, the planetary gear assembly also includes a plurality of needle bearings. Each of the plurality of planetary gears is mounted on one of the planetary pins by one of the needle bearings, and each of the radial holes is arranged to provide the lubricant to one of the needle bearings.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 2:
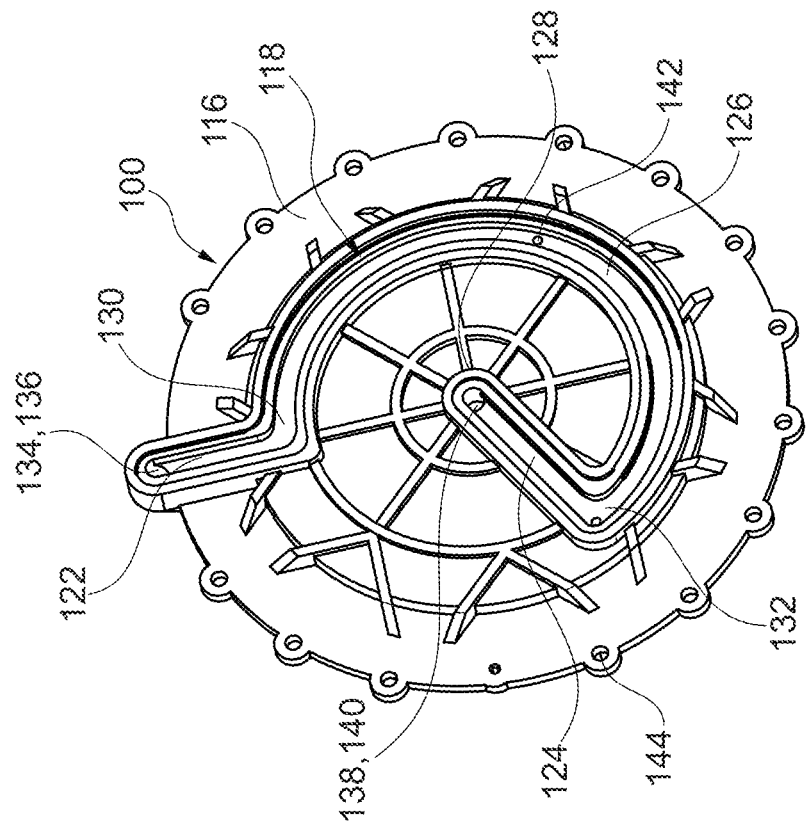
FIG. 2 illustrates a back side perspective view of the gearbox cover of FIG. 1.
Figure 1:
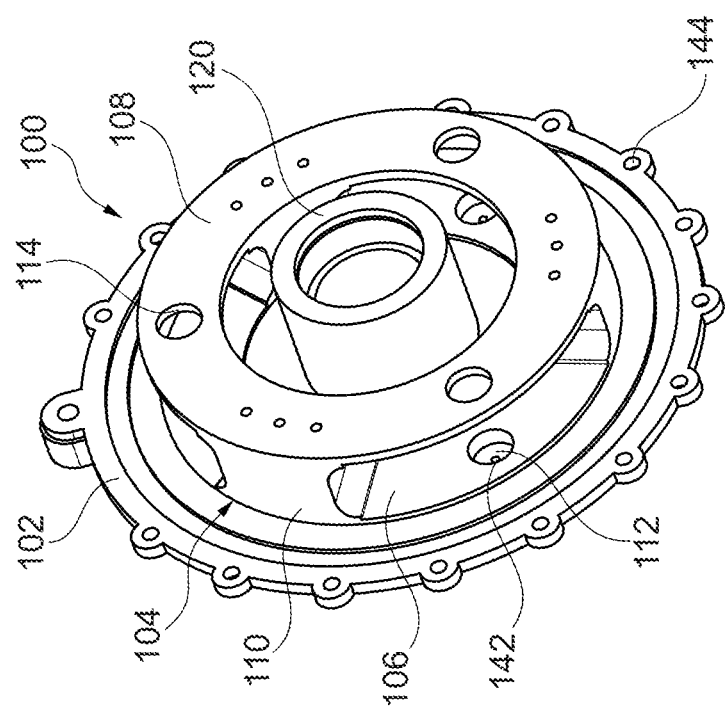
FIG. 1 illustrates a front-side perspective view of a gearbox cover according to an example embodiment.

The following description is made with reference to FIGS. 1-2. FIG. 1 illustrates a front-side perspective view of gearbox cover 100 according to an example embodiment. FIG. 2 illustrates a back side perspective view of gearbox cover 100 of FIG. 1. Gearbox cover 100 includes front side 102 including planetary carrier 104. The planetary carrier includes annular portion 106, annular portion 108, axially spaced from annular portion 106, and webs 110 connecting annular portion 106 to annular portion 108. In the embodiment shown, annular portions 106 and 108, and webs 110, are integrally formed from a same piece of material. Other embodiments, not shown, may include one or both of annular portions 106 and 108, and/or webs 110, formed as separate powdered metal components that are sintered together to form a single component, for example. Annular portion 106 includes holes 112 and annular portion 108 includes through holes 114, each aligned with one of the holes. That is, the holes and the through holes are aligned in an axial direction and arranged to receive axially oriented planetary pins as described below. Webs 110 are positioned circumferentially between respective pairs of through holes 114. Gearbox cover 100 also includes back side 116 including flow passage 118.

Front side 102 also includes tubular portion 120 arranged for receiving a sun gear as described below. Flow passage 118 includes radial segments 122 and 124 connected by partial circular segment 126. For example, radial segments 122 and 124 extend radially from central axis 128, and the partial circular segment extends around the central axis. Segment 122 extends radially outward from circumferential end 130 of segment 126, and segment 124 extends radially inward from circumferential end 132, opposite circumferential end 130, of segment 126. Flow passage hole 134 is arranged at radially outer portion 136 of radial segment 122 and flow passage hole 138 is arranged at radially inner portion 140 of radial segment 124. Flow passage hole 134 is arranged for receiving a lubricant from an external lubrication circuit comprising a lubricant pump (not shown), for example, and flow passage hole 138 is arranged to direct the lubricant to a hollow shaft (not shown) extending from tubular portion 120, for example. Gearbox cover 100 also includes through holes 142 connecting flow passage 118 with holes 112 such that, as the lubricant flows from hole 134 to hole 138, is it also distributed to a planetary gearset through holes 142 as described below. Holes 112 may be counterbored holes, as shown in the example embodiment, or through holes with a constant diameter arranged to receive the planetary pins, for example. Gearbox cover 100 also includes radially outer holes 144 for fixing the gearbox cover to a gearbox housing (not shown).

Figures 3, 4:
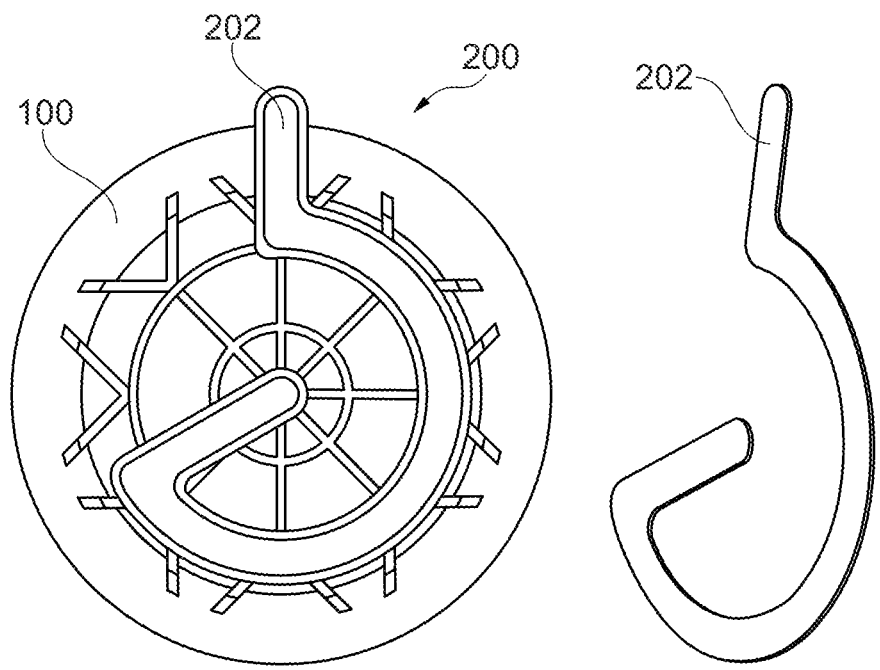
FIG. 3 illustrates a back view of a gearbox cover assembly according to an example embodiment.
FIG. 4 illustrates a perspective view of a flow passage cover of the gearbox cover assembly of FIG. 3.

The following description is made with reference to FIGS. 1-4. FIG. 3 illustrates a back view of gearbox cover assembly 200. FIG. 4 illustrates a perspective view of flow passage cover 202. Flow passage 118 is a groove formed in gearbox cover 100 and flow passage cover 202 seals the groove. Cover 202 has a same shape as the flow passage with a pair of radial segments connected by a partial circular segment. Cover 202 is sealed to the gearbox cover. In the embodiment shown, the flow passage cover is fixed to the flow passage by friction stir welding. Friction stir welding is used to join the two components using a rotating, non-consumable tool (not shown). Heat from the rotating tool softens the joint without melting the material so that the two components are mechanically intermixed, forging the metals by mechanical pressure applied by the tool to create a sealed joint. Here, the gearbox cover is a cast aluminum component and the flow passage cover is a stamped aluminum component. Other embodiments may include the flow passage cover as a stamped steel component, for example.

Figure 5:
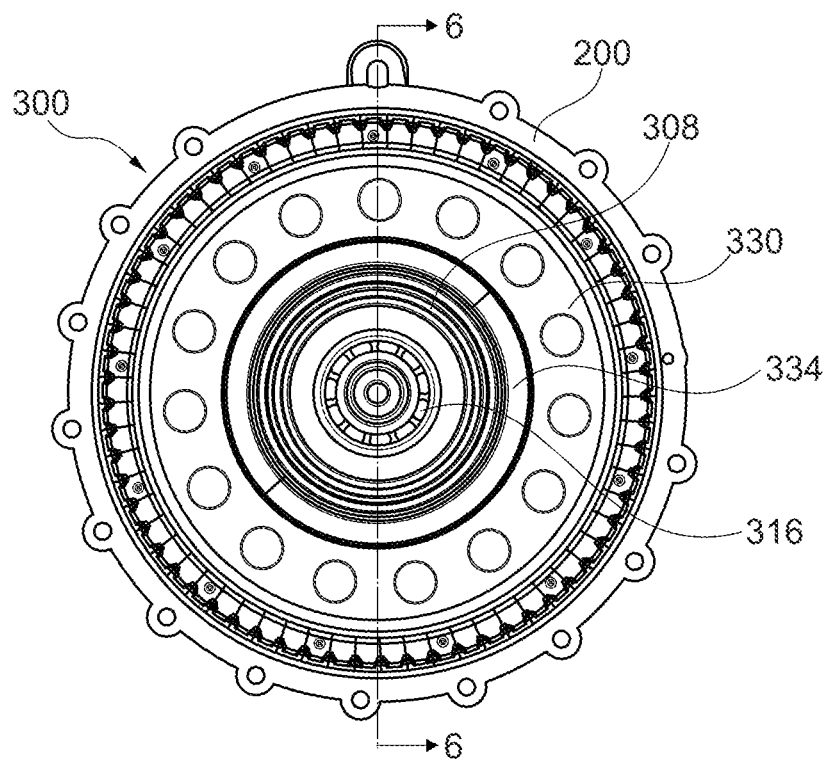
FIG. 5 illustrates a front view of a planetary gear assembly according to an example embodiment.
Figure 6:
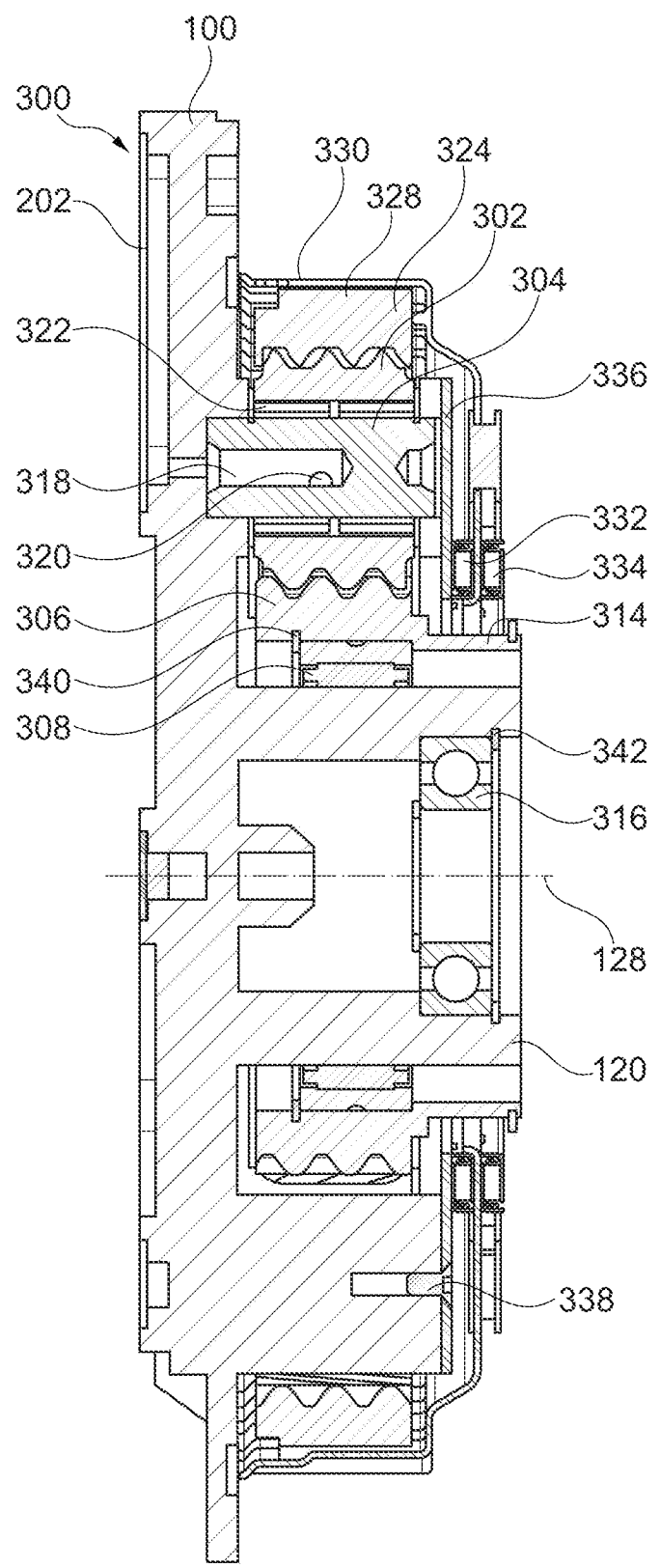
FIG. 6 illustrates a cross-sectional view of the planetary gear assembly of FIG. 5 taken generally along line 6-6 in FIG. 5.
Figure 7:
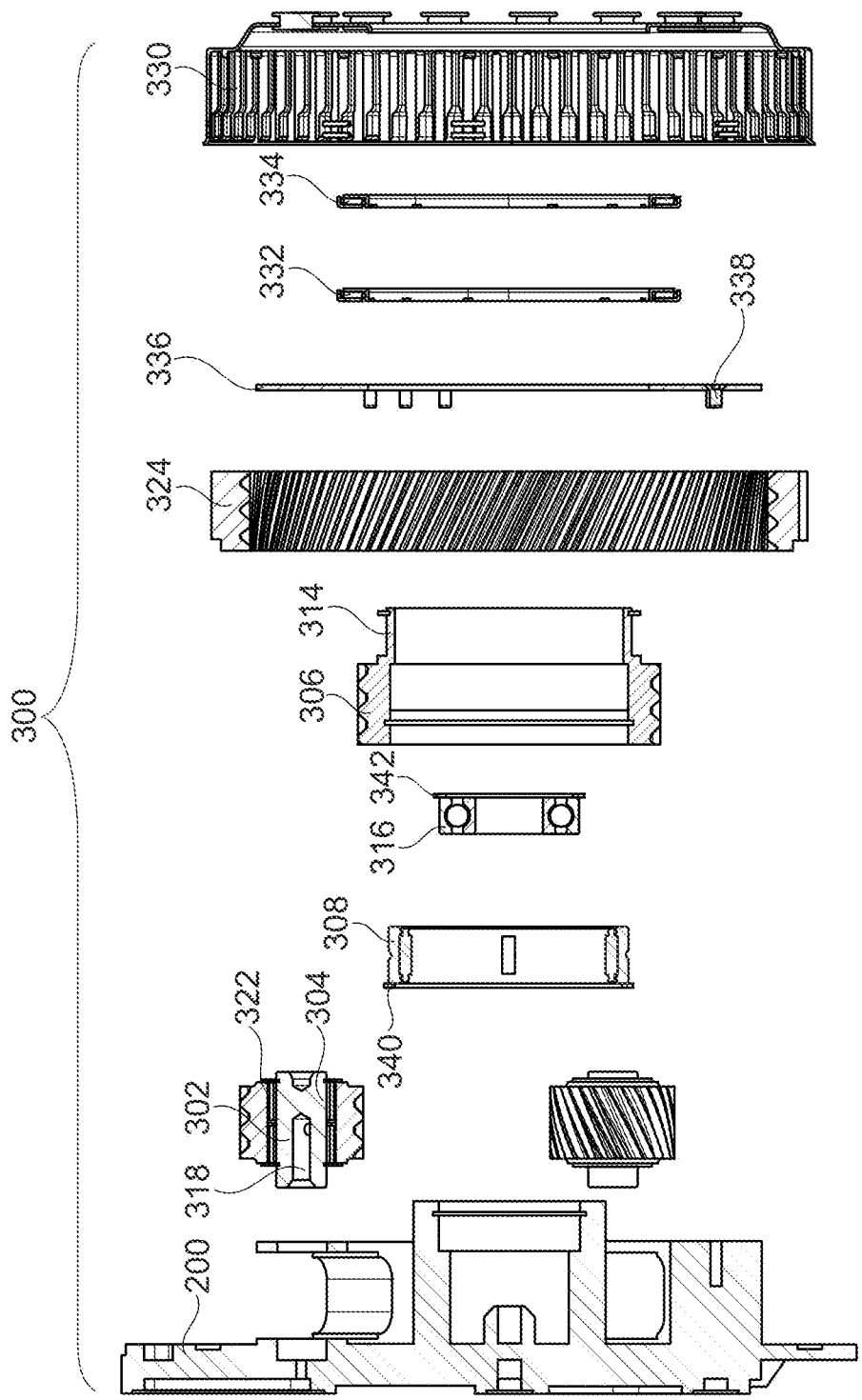
FIG. 7 illustrates an exploded cross-sectional view of the planetary gear assembly of FIG. 5.
Figure 8:
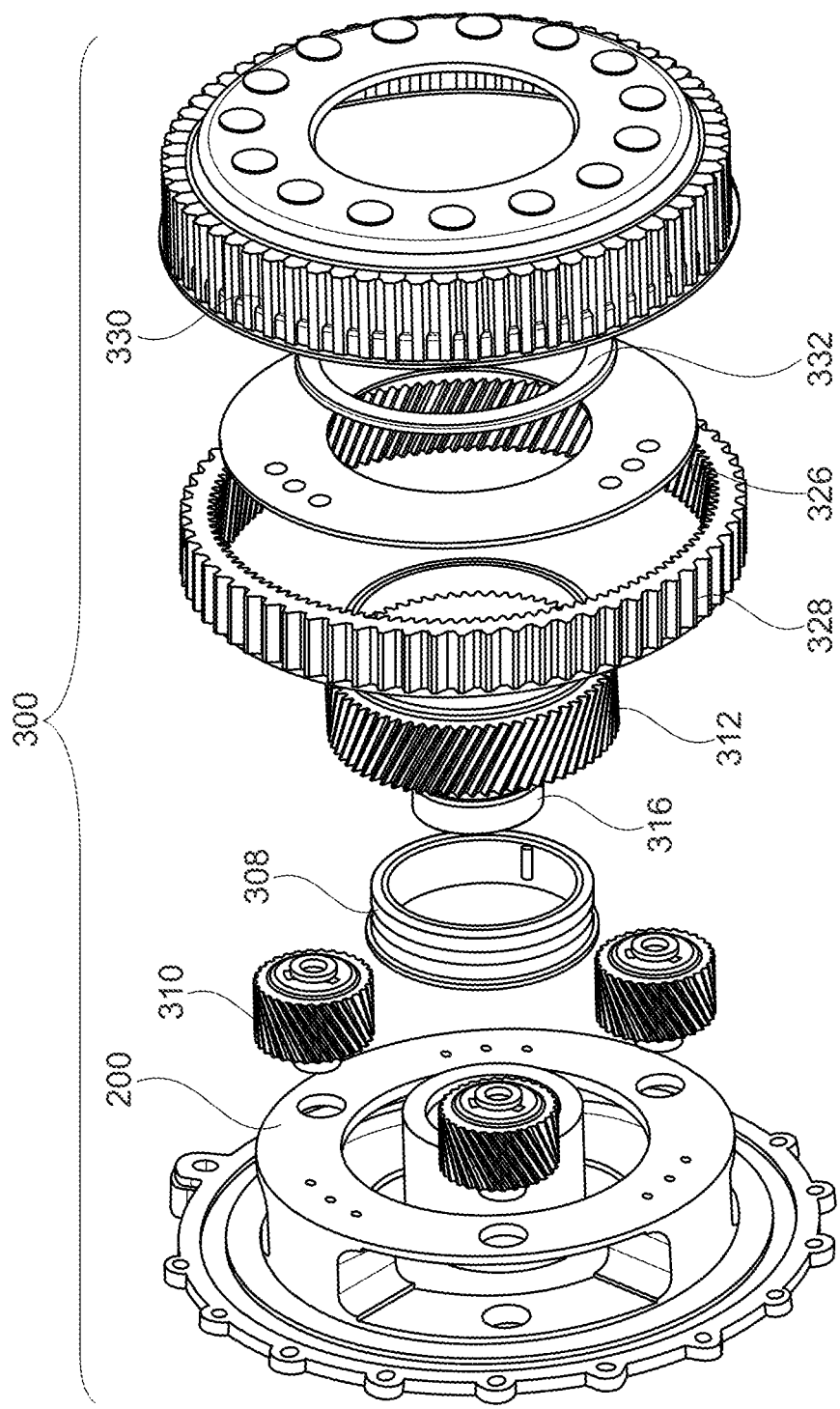
FIG. 8 illustrates a perspective exploded view of the planetary gear assembly of FIG. 5.

The following description is made with reference to FIGS. 1-8. FIG. 5 illustrates a front view of planetary gear assembly 300. FIG. 6 illustrates a cross-sectional view of planetary gear assembly 300 of FIG. 5 taken generally along line 6-6 in FIG. 5. FIG. 7 illustrates a cross-sectional exploded view of planetary gear assembly 300 of FIG. 5. FIG. 8 illustrates a perspective exploded view of planetary gear assembly 300 of FIG. 5.

Planetary gear assembly 300 includes gearbox cover assembly 200 and planetary gears 302. The planetary gears are rotatably mounted on planetary pins 304, each positioned in a hole 112 and in a through hole 114. Planetary gear assembly 300 also includes sun gear 306 drivingly engaged with the planetary gears and radial bearing 308. By drivingly engaged, we mean that each of planetary gears 302 includes a geared portion 310, and sun gear 306 includes geared portion 312, and geared portions 310 and 312 are intermeshed so that the planetary gears and the sun gear are arranged for co-rotation. Sun gear 306 is rotatably mounted on tubular portion 120 by radial bearing 308. Sun gear 306 includes tubular portion 314 arranged for connection with a further component (not shown). Planetary gear assembly 300 also includes ball bearing 316 positioned in counterbore 146 of tubular portion 120.

As beast viewed in FIG. 6, for example, each of planetary pins 304 include hollow portions 318 and radial holes 320. Flow passage 118 is arranged to provide a lubricant to the hollow portions and the radial holes. Through holes 142 connect flow passage 118 with holes 112 and hollow portions 318. Planetary gear assembly 300 also includes needle bearings 322 and planetary gears 302 are mounted planetary pins 304 by the needle bearings. Radial holes 320 are arranged to provide the lubricant to the needle bearings. Thus, lubricant enters flow passage 118, sealed by flow passage cover 202 through flow passage hole 134. As the lubricant traverses the flow passage, some of the lubricant flows through each through hole 142 into a hollow portion 318 and out a radial hole 320 to a needle bearing 322, lubricating the bearing for low friction rotation of a planetary gear 302. Remaining lubricant is expelled from the flow passage through flow passage hole 138 and tubular portion 120 to additional components.

Planetary gear assembly 300 also includes ring gear 324 with geared portion 326, intermeshed with geared portions 310 of the planetary gears, and outer spline 328, rotationally fixed in outer carrier 330. Axial bearings 332 and 334 are arranged on either axial side of the outer carrier. Annular bearing support 336 is fixed to gearbox cover assembly 200 by bolts 338 and is arranged to provide axial support for axial bearing 332. Radial bearing 308 is positioned in sun gear 306 by snap ring 340, and ball bearing 316 is positioned in tubular portion 120 by snap ring 342.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

- 100 Gearbox cover
- 102 Front side
- 104 Planetary carrier
- 106 Annular portion (first)
- 108 Annular portion (second)
- 110 Webs
- 112 Holes
- 114 Through holes (first)
- 116 Back side
- 118 Flow passage
- 120 Tubular portion (gearbox cover)
- 122 Radial segment
- 124 Radial segment
- 126 Partial circular segment
- 128 Central axis
- 130 Circumferential end (partial circular segment)
- 132 Circumferential end (partial circular segment)
- 134 Flow passage hole (first, radial segment 122)
- 136 Radially outer portion (radial segment 122)
- 138 Flow passage hole (second, radial segment 124)
- 140 Radially inner portion (radial segment 124)
- 142 Through holes (second)
- 144 Radially outer holes
- 200 Gearbox cover assembly
- 202 Flow passage cover
- 300 Planetary gear assembly
- 302 Planetary gears
- 304 Planetary pins
- 306 Sun gear
- 308 Radial bearing
- 310 Geared portion (planetary gears)
- 312 Geared portion (sun gear)
- 314 Tubular portion (sun gear)
- 316 Ball bearing
- 318 Hollow portion (planetary pin)
- 320 Radial hole (planetary pin)
- 322 Needle bearing
- 324 Ring gear
- 326 Geared portion (ring gear)
- 328 Outer spline (ring gear)
- 330 Outer carrier
- 332 Axial bearing
- 334 Axial bearing
- 336 Annular bearing support
- 338 Bolts (annular bearing support)
- 340 Snap ring (sun gear)
- 342 Snap ring (gearbox cover tubular portion)

What is claimed is:

1. A gearbox cover, comprising:
    a front side comprising a planetary carrier, the planetary carrier comprising:
        a first annular portion comprising a plurality of holes;
        a second annular portion, axially spaced from the first annular portion, comprising a first plurality of through holes, each aligned with one of the holes; and
        a plurality of webs connecting the first annular portion with the second annular portion; and
    a back side comprising a flow passage; and
    a second plurality of through holes, each connecting the flow passage with one of the holes.

2. The gearbox cover of claim 1 wherein the front side further comprises a tubular portion.

3. The gearbox cover of claim 1 wherein the flow passage comprises a radial segment connected to a partial circular segment.

4. The gearbox cover of claim 3 further comprising:
    a first flow passage hole arranged at a radially outer portion of the radial segment; or
    a second flow passage hole arranged at a radially inner portion of the radial segment.

5. The gearbox cover of claim 3 further comprising a first flow passage hole arranged at a radially outer portion of the radial segment, wherein the first flow passage hole is arranged for receiving a lubricant.

6. The gearbox cover of claim 1 further comprising a plurality of radially outer holes for fixing the gearbox cover to a gearbox housing.

7. A gearbox cover assembly comprising:
    the gearbox cover of claim 1; and
    a flow passage cover, wherein:
        the flow passage is a groove formed in the gearbox cover; and
        the flow passage cover seals the groove.

8. The gearbox cover assembly of claim 7 wherein the flow passage cover is fixed to the flow passage by friction stir welding.

9. The gearbox cover assembly of claim 7 wherein:
    the gearbox cover is a cast aluminum component; and
    the flow passage cover is a stamped steel or a stamped aluminum component.

10. A planetary gear assembly comprising:
    the gearbox cover assembly of claim 7; and
    a plurality of planetary gears rotatably mounted on a plurality of planetary pins, each one of the plurality of planetary pins positioned in one of the plurality of holes and in one of the first plurality of through holes.

11. The planetary gear assembly of claim 10 further comprising:
    a sun gear drivingly engaged with the plurality of planetary gears; and
    a radial bearing, wherein the gearbox cover further comprises a tubular portion and the sun gear is rotatably mounted on the tubular portion by the radial bearing.

12. The planetary gear assembly of claim 11 further comprising a ball bearing, wherein the tubular portion comprises a counterbore and the ball bearing is positioned in the counterbore.

13. The planetary gear assembly of claim 10 wherein:
    each of the plurality of planetary pins comprises a respective hollow portion and a respective radial hole; and
    the flow passage is arranged to provide a lubricant to the hollow portions and the radial holes.

14. The planetary gear assembly of claim 13 wherein:
the holes are counterbored holes; and
the gearbox cover further comprises a second plurality of through holes, each connecting the flow passage with one of the counterbored holes and one of the hollow portions.

15. The planetary gear assembly of claim 13 further comprising a plurality of needle bearings, wherein:
each of the plurality of planetary gears is mounted on one of the planetary pins by one of the needle bearings; and
each of the radial holes is arranged to provide the lubricant to one of the needle bearings.

\* \* \* \* \*